United States Patent [19]

Byrd, Jr. et al.

[11] Patent Number: 5,300,338
[45] Date of Patent: Apr. 5, 1994

[54] COEXTRUDED LAMINATES CONTAINING POLYKETONE POLYMERS

[75] Inventors: Paul S. Byrd, Jr.; Dixie G. Waters, both of Houston, Tex.

[73] Assignee: Shell Oil Company, Houston, Tex.

[21] Appl. No.: 880,948

[22] Filed: May 8, 1992

[51] Int. Cl.$^5$ .............................................. B29D 22/00
[52] U.S. Cl. ................................. 428/36.6; 428/423.1; 428/474.9; 428/476.3; 428/501; 428/542.8
[58] Field of Search ...................... 428/421, 474.9, 349, 428/423.1, 461, 36.6, 501, 542.8, 476.3; 525/529, 55, 179, 426; 528/392

[56] References Cited

U.S. PATENT DOCUMENTS

| | | | |
|---|---|---|---|
| 4,585,701 | 4/1986 | Bartoszek et al. | 428/421 |
| 4,600,614 | 7/1986 | Lancaster et al. | 428/349 X |
| 4,647,509 | 3/1987 | Wallace et al. | 428/474.9 |
| 4,678,713 | 7/1987 | Lancaster et al. | 428/421 |
| 4,808,678 | 2/1989 | Lutz | 525/529 |
| 4,816,514 | 3/1989 | Lutz | 525/55 |
| 4,818,786 | 4/1989 | Gergen et al. | 525/55 |
| 4,818,798 | 4/1989 | Gergen | 525/55 |
| 4,839,437 | 6/1989 | Gergen et al. | 525/426 |
| 4,871,618 | 10/1989 | Kinneberg et al. | 428/461 |
| 4,880,904 | 11/1989 | Kinneberg et al. | 528/392 |
| 4,935,304 | 6/1990 | Danforth | 428/423.1 |
| 4,996,086 | 2/1991 | Gerlowski et al. | 428/36.6 |
| 5,043,389 | 8/1991 | Gergen et al. | 525/179 |
| 5,064,724 | 11/1991 | Ofstein | 428/501 |

FOREIGN PATENT DOCUMENTS 191690  1/1986  European Pat. Off. .

Primary Examiner—Paul J. Thibodeau
Assistant Examiner—H. Thi Le
Attorney, Agent, or Firm—James O. Okorafor

[57] ABSTRACT

A coextruded laminate may be formed by coextruding a linear alternating polymer of carbon monoxide and at least one ethylenically unsaturated hydrocarbon (a polyketone polymer) with an other thermoplastic polymer, without the use of an adhesive or tie layer, wherein the other thermoplastic polymer is polyvinylidene fluoride, nylon-6,6, or phenoxy resin.

18 Claims, No Drawings

COEXTRUDED LAMINATES CONTAINING POLYKETONE POLYMERS

FIELD OF THE INVENTION

This invention relates to polyketone polymers, and, more particularly, to a coextruded product of a polyketone polymer and an other thermoplastic polymer. These coextruded products are prepared without the use of an adhesive or tie layer, yet still exhibit strong adhesion between the layers.

BACKGROUND OF THE INVENTION

Coextrusion of multiple layers of different polymers through a common die is used to produce a variety of polymer products, such as sheet, film, coatings, profiles, pipe, tubing, and foam-core products. Food and beverage packaging is a common application of such coextruded products. Sheet or film, for example, are often shaped after coextrusion into various packaging items by methods such as thermoforming, solid-phase pressure forming, or stamping. Preparation of tubing and hoses for use in automobiles and industrial equipment is another application. Individual polymers exhibit a wide variety of properties, such as permeability to oxygen, water vapor, and other gases and liquids, and chemical resistance to acids, bases, hydrocarbons, oils, alcohols, and other materials. Coextrusion of multiple polymer layers can be used to prepare a product with optimum properties for a particular application.

No comprehensive theory exists for predicting interlayer adhesion in coextrusion of different polymers. Most knowledge comes from trial-and-error testing of the polymers. Even materials which form compatible blends do not necessarily exhibit good adhesion when coextruded. For example, a polyketone polymer and an ethylene vinyl alcohol copolymer will form a compatible blend, but will not adhere when coextruded. Adhesive polymers are commonly used as "tie layers" to bond incompatible polymers that do not normally adhere to each other. Ethylene-vinyl acetate, ethylene-acrylic acid, and ethylene-methyl acrylate copolymers are commonly used as tie layers.

Coextrusion of polymers without the use of tie layers allows the use of simpler equipment, and production of a lower cost product. It is an object of this invention to provide a coextruded product of two or more dissimilar polymer layers, produced without the use of any tie layers.

In an analogous processing technique, injection molding may be used to form composite parts by injecting two or more polymers into the same mold to make a composite part. The specialized techniques used to produce such composite parts include coinjection, dual shot, multi-shot, and shuttle molding. As an alternative, a pre-molded article may be inserted into a larger mold cavity, and a second polymer injected into the larger mold, coating part or all of the surface of the premolded article. This technique is known as insert molding. In the fabrication of such composite parts, it is essential to have strong adhesion between the different polymer surfaces to maintain the integrity of the product molded article. It is another object of this invention to provide a composite part, prepared through injection molding of two or more dissimilar polymers and without the use of any adhesive or tie layer between the dissimilar polymers.

In particular, it is an object of this invention to provide a coextruded product or composite part of a polyketone polymer and an other thermoplastic polymer, produced without the use of any adhesive or tie layer. Surprisingly, after extensive trial-and-error testing, only a few other thermoplastic polymers have been found that meet this objective.

SUMMARY OF THE INVENTION

The present invention provides a coextruded laminate of a polyketone polymer and an other thermoplastic polymer, wherein the two polymers exhibit strong adhesion without the use of an adhesive or tie layer. The present invention also includes a composite part of two or more polymer sections, prepared by injection molding a polyketone polymer and an other thermoplastic polymer, wherein adjacent sections of the composite part adhere to each other without the use of any adhesive or tie layer. The other thermoplastic polymers of the invention include polyvinylidene fluoride, nylon-6,6, and phenoxy resin.

Since no adhesive or tie layer is required, the coextruded laminates may include only two layers. In one alternative, the laminate may include three layers, wherein either the other thermoplastic polymer is sandwiched between two layers of the polyketone polymer, or the polyketone polymer is sandwiched between two layers of the other thermoplastic polymer. In another alternative, the polyketone polymer may be sandwiched between two different other thermoplastic polymers of the invention. Multi-ply laminates which include one or more layers of polyketone polymer and one or more layers of an other thermoplastic polymer, wherein the multi-ply laminate includes superimposed layers of a polyketone polymer and an other thermoplastic polymer adhered to each other without the use of an adhesive or tie layer, are also considered to be within the scope of this invention. The coextruded laminates of the invention may be flat, such as sheet or film; shaped, such as pipe or tubing; or further processed, such as by blow molding into containers, etc.

The present invention also provides a process for making a coextruded laminate of two or more layers by coextruding a polyketone polymer with another thermoplastic polymer, without the use of an adhesive or tie layer between the polymer layers. A process for making a composite part of two or more sections, prepared by injection molding a polyketone polymer and an other thermoplastic polymer, wherein the adjacent sections of polyketone polymer and other thermoplastic polymer adhere to each other without the use of any adhesive or tie layer, is also considered within the scope of this invention.

DETAILED DESCRIPTION OF THE INVENTION

The polyketone polymers of the invention are thermoplastic polymers of a linear alternating structure and contain substantially one molecule of carbon monoxide for each molecule of unsaturated hydrocarbon. Hereinafter, these polymers may be simply referred to as polyketones. Ethylenically unsaturated hydrocarbons suitable for use as precursors of the polyketone polymers have up to 20 carbon atoms inclusive, preferably up to 10 carbon atoms, and are aliphatic such as ethylene and other α-olefins including propylene, 1-butene, isobutylene, 1-hexene, 1-octene and 1-dodecene, or are arylaliphatic, containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene.

The preferred polyketone polymers are copolymers of carbon monoxide and ethylene or terpolymers of carbon monoxide, ethylene and a second ethylenically unsaturated hydrocarbon of at least 3 carbon atoms, preferably an α-olefin such as propylene. When the preferred polyketone terpolymers are employed, there will be within the terpolymer at least about 2 units derived from a monomer of ethylene for each unit derived from a monomer of the second hydrocarbon. Preferably, there will be from about 10 units to about 100 units derived from a monomer of ethylene for each unit derived from a monomer of the second hydrocarbon. The polymer chain of the preferred polyketone polymers has recurring units represented by the formula

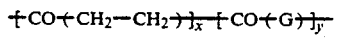

wherein G is derived from the monomer of ethylenically unsaturated hydrocarbon of at least 3 carbon atoms polymerized through the ethylenic unsaturation and the ratio of y:x is no more than about 0.5. When copolymers of carbon monoxide and ethylene are employed in the blends of the invention, there will be no second hydrocarbon present and the copolymers are represented by the above formula wherein y is zero. When y is other than zero, i.e., terpolymers are employed, the—CO—(—CH$_2$—CH$_2$—)—units and the —CO—(—G—)—units are found randomly throughout the polymer chain, and preferred ratios of y:x are from about 0.01 to about 0.1. The end groups or "caps" of the polymer chain will depend upon what materials were present during the production of the polymer and whether or how the polymer was purified. The precise nature of the end groups does not appear to influence the properties of the polymer to any considerable extent, so the polymers are fairly represented by the formula for the polymer chain as depicted above.

Of particular interest are the polyketone polymers of number average molecular weight from about 1000 to about 200,000, particularly those of number average molecular weight from about 20,000 to about 90,000, as determined by gel permeation chromatography. The physical properties of the polymer will depend in part upon the molecular weight, whether the polymer is a copolymer or a terpolymer and, in the case of terpolymers, the nature and proportion of the second hydrocarbon present. Typical melting points for the polymers are from about 175° C. to about 300° C., more typically from about 210° C. to about 270° C. The polymers have a limiting viscosity number (LVN), measured in m-cresol at 60° C. in a standard capillary viscosity measuring device, from about 0.5 dl/g to about 10 dl/g, more frequently from about 0.8 dl/g to about 4 dl/g.

The polyketone polymers of the invention may include other polymers in amounts that are insufficient to reduce the adhesion exhibited between the polyketone polymers and the other thermoplastic polymers of the invention.

U.S. Pat. No. 4,880,903 (Van Broekhoven et al.) discloses a linear alternating polyketone terpolymer of carbon monoxide, ethylene, and other olefinically unsaturated hydrocarbons, such as propylene. Processes for production of the polyketone polymers typically involve the use of a catalyst composition formed from a compound of a Group VIII metal selected from palladium, cobalt, or nickel, the anion of a strong non-hydrohalogenic acid, and a bidentate ligand of phosphorus, arsenic or antimony. U.S. Pat. No. 4,843,144 (Van Broekhoven et al.) discloses a process for preparing polymers of carbon monoxide and at least one ethylenically unsaturated hydrocarbon using a catalyst comprising a compound of palladium, the anion of a non-hydrohalogenic acid having a pKa of below about 6 and a bidentate ligand of phosphorus.

The carbon monoxide and hydrocarbon monomer(s) are contacted under polymerization conditions in the presence of a catalyst composition formed from a compound of palladium, the anion of a non-hydrohalogenic acid having a pKa (measured in water at 18° C.) of below about 6, preferably below 2, and a bidentate ligand of phosphorus. The catalyst composition may be formed from a variety of materials, but without wishing to be limited, a preferred palladium compound is a palladium carboxylate, particularly palladium acetate, a preferred anion is the anion of trifluoroacetic acid or p-toluenesulfonic acid and a preferred bidentate ligand of phosphorus is 1,3-bis(diphenylphosphino)propane or 1,3-bis[di(2-methoxyphenyl)phosphino]propane.

The polymerization to produce the polyketone polymer is conducted in an inert reaction diluent, preferably an alkanolic diluent, and methanol is preferred. The reactants, catalyst composition and reaction diluent are contacted by conventional methods such as shaking, stirring or refluxing in a suitable reaction vessel. Typical polymerization conditions include a reaction temperature from about 20° C. to about 150° C., preferably from about 50° C. to about 135° C. The reaction pressure is suitably from about 1 atmosphere to about 200 atmospheres but pressures from about 10 atmospheres to about 100 atmospheres are preferred. Subsequent to polymerization, the reaction is terminated, for example, as by cooling the reactor and contents and releasing the pressure. The polyketone polymer is typically obtained as a product substantially insoluble in the reaction diluent and the product is recovered by conventional methods, such as filtration or decantation. The polyketone polymer is used as recovered or the polymer is purified, for example, by contact with a solvent or extraction agent which is selective for catalyst residues.

The other thermoplastic polymers of the invention are those which exhibit a strong, interactive adhesion when processed with a polyketone polymer. Interactive adhesion occurs when the adhesion between the polyketone polymer and the other thermoplastic polymer is so great that the layers cannot be separated without destroying one or both layers. For example, when coextruded with a polyketone polymer, such other thermoplastic polymers will form a laminate that may be flexed, kinked, or cut, and the layers will continue to act like a single unit. Thermoplastic polymers which exhibit such a strong, interactive adhesion with a polyketone polymer include polyvinylidene fluoride, nylon-6,6, and phenoxy resins.

The thermoplastic polyvinylidene fluoride of the invention is produced from monomer units of vinylidene fluoride. The polyvinylidene fluoride is preferably a homopolymer of vinylidene fluoride. Alternatively, a copolymer of at least 90 mole % vinylidene fluoride is suitable where the remainder is produced from other fluorinated monomer units, such as tetrafluoroethylene, hexafluoropropylene, or vinyl fluoride. Polyvinylidene fluoride polymers are well known in the art, and are produced by conventional methods. Such polymers are also commercially available, e.g. Kynar ® 460, manufactured by Atochem.

The nylon of the invention is nylon-6,6, a condensation product of adipic acid and hexamethylenediamine. Nylon-6,6 is a thermoplastic polyamide polymer, also known as polyhexamethyleneadipamide, or poly(hexamethylenediamine-coadipic acid), or poly(iminohexamethyleneiminoadipoyl). Nylon-6,6 is well known in the art, and is produced by conventional methods. Nylon-6,6 is also commercially available, e.g. Zytel ® 101, manufactured by DuPont Polymers.

The family of thermoplastic polyamides also includes nylon-4,6, nylon-6, nylon-11, nylon-12, and nylon-6,12. These other thermoplastic polyamides may be blended with the nylon of the invention in small amounts that are insufficient to reduce the adhesion to polyketones exhibited by the neat nylon-6,6.

The phenoxy resin of the invention is a high molecular weight thermoplastic polymer derived from a bisphenol and epichlorohydrin. The number average molecular weights of the phenoxy resins are typically about 45,000, while those of epoxy thermoset resins are typically no more than 8,000. The phenoxy resins also lack the terminal epoxide functionality of the epoxy resins, and are therefore thermally stable. Phenoxy resins may be classified as polyols or polyhydroxyethers, and have the general formula:

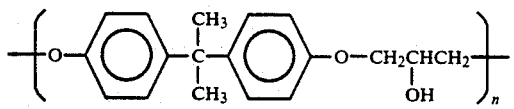

wherein n is typically at least about 100. Phenoxy resins are well known in the art, and are produced by conventional methods. Such polymers are also commercially available, e.g. Ucar ® PKHH, manufactured by Union carbide Chemicals and Plastics.

The polymers of the invention may also include conventional additives such as antioxidants and stabilizers, dyes, fillers or reinforcing agents, fire resistant materials, mold release agents, colorants and other materials designed to improve the processability of the polymers or the properties of the resulting products. Such additives are added prior to, or concurrent with the processing of the polyketone and the other thermoplastic polymers.

Coextrusion techniques and equipment are well known in the art. Coextrusion involves the extrusion of molten or plastified polymers through adjacent or multimanifold dies, such that the extrudates, still in molten, semi-molten, or plastified form, are brought together to form multi-ply laminates. The feedblock and die(s) must be designed to preserve layer thicknesses as the molten polymers move downstream. The thickness of each ply usually is in the range of about 0.05 mils to about 50 mils or more, depending on the desired end use. The plies can be of the same thickness, or different. The material used in each ply is usually different from any adjacent ply, but can be repeated in the same multi-ply laminate. Film laminates typically have a thickness of from about 0.5 mils to about 10 mils, while sheet laminates (which are frequently used for thermoforming, typically have a thickness of from about 10 mils to about 100 mils or more. Similar techniques are used to produce both flat articles, such as film and sheet, shaped articles for packaging and other uses, and profiles, such as pipe and tubing.

The subject invention may also be exploited through use of other methods, such as insert molding, injection molding, and blow molding. For example, adhesion between the polyketone and other thermoplastic polymers may be achieved by applying a molten layer of one polymer onto a finished artifact or solid insert prepared from the other polymer. Two-shot injection molding may be used to prepare shaped articles that would contain layers or sections of polyketone and other thermoplastic polymers, or an article of one polymer encapsulated within the other polymer. A cross-head die, for example, may be used to extrude one molten polymer over a rod or tube made from the other polymer. Blow molding, for example, involves placing a molten coextruded polymer tube or parison in a mold, and applying sufficient air pressure inside the parison to force it into the shape of the mold. Blow molding is particularly suitable for making bottles and other containers, toys, and various industrial items. These and other methods may be utilized to exploit the adhesion between polyketone and other thermoplastic polymers.

The method of producing the articles of the invention is not material so long as the laminates or other articles are produced without undue degradation of the polymer components.

The invention is further illustrated by the following Examples which should not be regarded as limiting.

EXAMPLE 1

A linear alternating terpolymer of carbon monoxide, ethylene, and propylene (DP MX500) was produced in the presence of a catalyst composition formed from palladium acetate, trifluoroacetic acid, and 1,3-bis[di(2-methoxyphenyl)phosphino]propane. The polyketone polymer had a melting point of about 220° C. and an LVN of about 1.8 dl/g when measured in m-cresol at 60° C. The polyketone polymer also contained conventional additives.

EXAMPLE 2

Bilayered tubing was made from the polyketone polymer of Example 1 and a polyvinylidene fluoride polymer. For comparison, bilayered tubing was also made with a polyvinyl chloride polymer (not of the invention). The polyvinylidene fluoride polymer was manufactured by Atochem North America, and the polyvinyl chloride was a rigid or unplasticized grade manufactured by Westlake.

The bilayered tubing was made in a coextrusion process which utilized two Killion single-screw extruders. The compression ratio of the extruders was 3:1, and the length to diameter ratio was 24:1. A 1.5 inch diameter extruder was used to process the substrate polymer, and a 1 inch diameter extruder was used for the coating polymer. Both extruders fed into a single manifold coextrusion die. Best results with this type of die were obtained by starting the 1 inch diameter coating extruder first, followed by the 1.5 inch diameter substrate extruder, to prevent plugging in the die. The coextruded tubing was pulled at a rate of about 20 feet per minute from the die, through a weir sizer, and into a cooling tank. The coextruded coating layer was about 10 mils thick, and the coextruded substrate layer was about 30 mils thick.

The polymers were processed as close as possible to the manufacturer's specifications. Each halopolymer was extruded as a coating over a molten polyketone substrate. The polyketone polymer was processed at a melt temperature between 232° and 243° C. Different melt and die temperatures were used for the various coating polymers. The polyvinylidene fluoride was processed at a melt temperature of about 238° C. and the polyvinyl chloride was processed at a melt temperature of about 202° C. The die temperature was set at 243° C. for the polyvinyl fluoride/ polyketone coextrusion, and at 232° C. for the polyvinyl chloride/ polyketone coextrusion.

After cooling, the two types of tubing were flexed, kinked, and cut open longitudinally. The polyvinylidene fluoride and polyketone layers acted as a single unit and could not be separated. An attempt was made to separate the polyvinylidene fluoride and polyketone layers, in order to conduct a "peel" test for adhesion, however adhesion between the two layers was too great to allow separation without destroying one or both layers of polymer. This type of adhesion was designated interactive adhesion.

By comparison, the polyvinyl chloride and polyketone layers acted as a single unit only until the integrity of either layer was impaired. The tubing could be flexed or kinked without delamination, however, once either layer was cut, the two layers were easily separated. This type of adhesion was designated as a mechanical bond (not of the invention).

EXAMPLE 3

Bilayered tubing was made from the polyketone polymer of Example 1 and nylon-6,6. For comparison, bilayered tubing was also made from nylon-6 and two blends of nylon-6,6 with nylon-12 (not of the invention). The nylon-6 and nylon-6,6 were manufactured by DuPont Polymers, and the nylon-12 was manufactured by Hüls America. The blends of nylon-6,6 with nylon-12 were prepared by combining proportionate amounts of the solid polymers prior to melting and coextruding. The two blends were 10 wt % nylon-6,6 and 90 wt % nylon-12; and 25 wt % nylon-6,6 and 75 wt % nylon-12. The tubing was made by the method of Example 2. Each nylon or nylon blend was extruded as a coating over a molten polyketone substrate. The nylon-6,6 was processed at a melt temperature of about 288° C., and a die temperature of about 293° C. For the nylon-6 and nylon blends, the melt processing and die temperatures were: nylon-6, 210° C. and 232° C.; blend of 25 wt % nylon-6,6 and 75 wt % nylon-12, 213° C. and 241° C.; blend of 10 wt % nylon-6,6 and 90 wt % nylon-12, 213° C. and 238° C.

Of the nylons evaluated, only the nylon-6,6 exhibited a strong interactive adhesion with the polyketone polymer. The nylon-6 exhibited a mechanical bond (as described in Example 2). The two types of tubing made from blends of nylon-6,6 with nylon-12 were flexed, kinked, and cut open, yet the layers continued to act as a single unit. However, it was possible to separate the layers by applying a strong force by hand. This type of adhesion was designated as a strong resistance to peel (not of the invention).

EXAMPLE 4

Bilayered tubing was made from the polyketone polymer of Example 1 and a thermoplastic phenoxy resin manufactured by Union Carbide. For comparison, bilayered tubing was also made with a bisphenol A polycarbonate manufactured by Miles (not of the invention).

The tubing was made by the method of Example 2. Both the phenoxy resin and polycarbonate polymer were extruded as a coating over a molten polyketone substrate. The phenoxy resin was processed at a melt temperature of about 204° C. and a die temperature of about 232° C., and the bisphenol A polycarbonate was processed at a melt temperature of about 260° C. and a die temperature of about 260° C.

The phenoxy resin exhibited a strong, interactive adhesion when processed with a polyketone polymer. In comparison, the polycarbonate polymer showed no adhesion when processed with a polyketone polymer. When flexed, the two layers of the polycarbonate/polyketone tubing acted independently, resulting in an obvious delamination, or gathering of the surface coating at the bend.

EXAMPLE 5

The polyketone terpolymer of Example 1 is injection molded on an injection molding machine to form a small plaque. This small plaque is attached inside a larger mold. Molten phenoxy resin is slowly injected into the larger mold containing the polyketone plaque. The other polymer fills the remaining space within the mold, surrounding the polyketone plaque on all but one side, and forming a composite plaque. An attempt is made to separate the phenoxy resin from the polyketone, however, the two materials cannot be separated.

EXAMPLE 6

For comparison, an attempt was made to prepare bi-layered tubing from a polyketone polymer and a number of other thermoplastic polymers. However, none of these materials exhibited any adhesion to the polyketone polymer of the invention. A list of these polymers (not of the invention) is included as Table 1. As described in Example 4, a bisphenol A polycarbonate polymer also showed no adhesion to a polyketone polymer.

It is particularly interesting to note that the ethylene/methyl acrylate (EMA) copolymer, which is commonly used as a tie layer to joint two dissimilar polymers, showed no adhesion with a polyketone polymer.

Other embodiments of the invention will be apparent to those skilled in the art from a consideration of this specification, or by practice of the invention described herein. It is intended that the specification and examples be considered as exemplary only, with the true scope and spirit of the invention being indicated by the following claims.

TABLE 1

| Polymers Exhibiting No Adhesion to Polyketone Polymers | | |
|---|---|---|
| Polymer | Manufacturer | Trade Name |
| ethylene/methyl acrylate (EMA) copolymer | DuPont Polymers | Vamac ® N-123 |
| ethylene/methacrylic acid copolymer | DuPont Polymers | Nucrel ® 535 |

TABLE 1-continued

| Polymers Exhibiting No Adhesion to Polyketone Polymers | | |
|---|---|---|
| Polymer | Manufacturer | Trade Name |
| ethylene/methacrylic acid copolymer, partially neutralized | Dow Chemicals | Primacore ® 1460 |
| ethylene/vinyl alcohol copolymer | Eval Company | Eval ® EP F |
| ethylene/methacrylic acid copolymer, partially neutralized | DuPont Polymers | Surlyn ® 1601 |
| polyether block esteramide copolymer | Atochem Polymers | Pebax ® 4033 |
| styrene/acrylonitrile copolymer | Monsanto Company | Lustran ® 31 |
| dynamically vulcanized thermoplastic polyolefin | Advanced Elastomer Systems | Santoprene ® 101/73 |

What is claimed is:

1. A coextruded multi-ply laminate consisting essentially of:
   a first polymer layer comprising a linear alternating polyketone polymer of carbon monoxide and at least one α-olefin, and
   a second polymer layer of polyhexamethyleneadipamide wherein the second polymer layer is superimposed on and exhibits an interactive adhesion to the first polymer layer such that the adhesion is too great to allow separation without destroying one or both layers of polymer.

2. The laminate of claim 1 wherein the polyketone polymer has recurring units represented by the formula

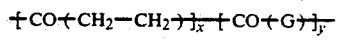

wherein G is derived from a monomer of an α-olefin of at least 3 carbon atoms polymerized through the ethylenic unsaturation and the ratio of y:x is no more than about 0.5.

3. The laminate of claim 2 wherein, in the linear alternating polymer, G is derived from a monomer of propylene and the ratio of y:x is from about 0.01 to about 0.1.

4. The laminate of claim 2 wherein, in the linear alternating polymer, y is zero.

5. The laminate of claim 1 wherein the laminate is coextruded in a cylindrical shape.

6. The laminate of claim 1 wherein the laminate is coextruded into a parison and blow molded into a container.

7. An article made from the laminate of claim 1.

8. A coextruded laminate of three polymer layers consisting essentially of
   a first polymer layer consisting essentially of a linear alternating polyketone polymer of carbon monoxide and at least one α-olefin;
   a second polymer layer of phenoxy resin which exhibits an interactive adhesion to the first polymer such that the adhesion is too great to allow separation without destroying one or both layers of polymer; and
   a third polymer layer which is the same as the first polymer layer, wherein the second polymer layer is located between the first and third polymer layers.

9. The laminate of claim 8 wherein the polyketone polymer has recurring units represented by the formula

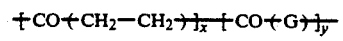

wherein G is derived from a monomer of an α-olefin of at least 3 carbon atoms polymerized through the ethylenic unsaturation and the ratio of y:x is no more than about 0.5.

10. The laminate of claim 9 wherein, in the linear alternating polymer, G is derived from a monomer of propylene and the ratio of y:x is from about 0.01 to about 0.1.

11. The laminate of claim 9 wherein, in the linear alternating polymer, y is zero.

12. The laminate of claim 9 wherein the laminate is coextruded in a cylindrical shape.

13. The laminate of claim 9 wherein the laminate is coextruded into a parison and blow molded into a container.

14. An article made from the laminate of claim 9.

15. A composite part comprising two or more polymer sections, prepared by injection molding a first polymer consisting essentially of a linear alternating polyketone polymer of carbon monoxide and at least one α-olefin; and a second polymer consisting essentially of nylon-6,6 wherein the first and second polymer sections adhere to each other without the use of an adhesive or tie layer.

16. The composite part of claim 15 wherein the polyketone polymer has recurring units represented by the formula

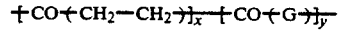

wherein G is derived from a monomer of an α-olefin of at least 3 carbon atoms polymerized through the ethylenic unsaturation and the ratio of y:x is no more than about 0.5.

17. The composite part of claim 16 wherein, in the linear alternating polymer, G is derived from a monomer of propylene and the ratio of y:x is from about 0.01 to about 0.1.

18. The composite part of claim 16 wherein, in the linear alternating polymer, y is zero.

* * * * *